United States Patent [19]

Valantin

[11] 4,129,990

[45] Dec. 19, 1978

[54] ADVANCING SUPPORT

[75] Inventor: Alfred Valantin, Clermont, France

[73] Assignee: Charbonnages de France, Paris, France

[21] Appl. No.: 762,798

[22] Filed: Jan. 25, 1977

[30] Foreign Application Priority Data

Jan. 26, 1976 [FR] France .............................. 76 01961

[51] Int. Cl.$^2$ ............................................ E02D 15/44
[52] U.S. Cl. .................................... 405/299; 305/16
[58] Field of Search ................................ 61/45 D, 63; 299/31–33; 91/170 MP; 305/16, 17, 18

[56] References Cited

U.S. PATENT DOCUMENTS

| 2,826,898 | 3/1958 | Joy | 61/45 D |
| 2,899,800 | 8/1959 | Joy | 61/45 D |

FOREIGN PATENT DOCUMENTS

| 1030282 | 5/1958 | Fed. Rep. of Germany | 61/45 D |
| 1092412 | 11/1960 | Fed. Rep. of Germany | 61/45 D |
| 1139084 | 11/1962 | Fed. Rep. of Germany | 61/45 D |
| 1171859 | 6/1964 | Fed. Rep. of Germany | 61/45 D |

Primary Examiner—Dennis L. Taylor
Attorney, Agent, or Firm—Cushman, Darby & Cushman

[57] ABSTRACT

An advancing support for providing a continuous propping, particularly for providing a continuous propping of mine galleries or like passageways, comprising at least two carriages for articulated tracks, each of said carriages including a beam having rounded ends and an articulated track closely surrounding the beam mounted for sliding friction on the beam, each of said beams being divided into spaced-apart longitudinal elements, a connecting element pivotally attached to each of said longitudinal elements for joining them together, said carriages being disposed one above the other to be applied respectively against the floor and roof of a gallery; at least one jack attached to the connecting element of the upper carriage and the connecting element of the lower carriage thereby joining said carriages together.

12 Claims, 8 Drawing Figures

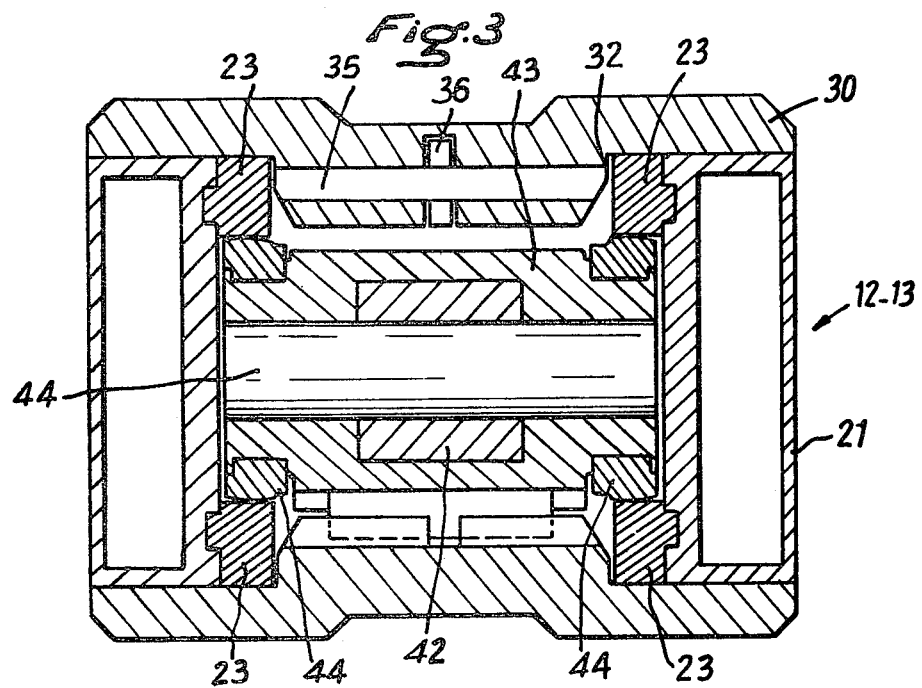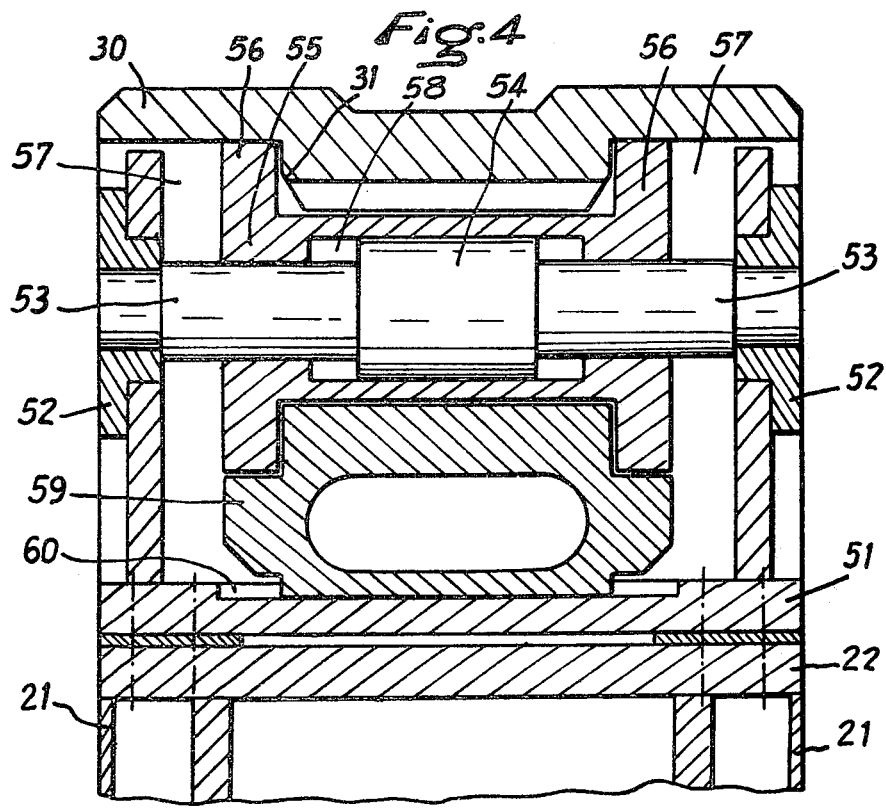

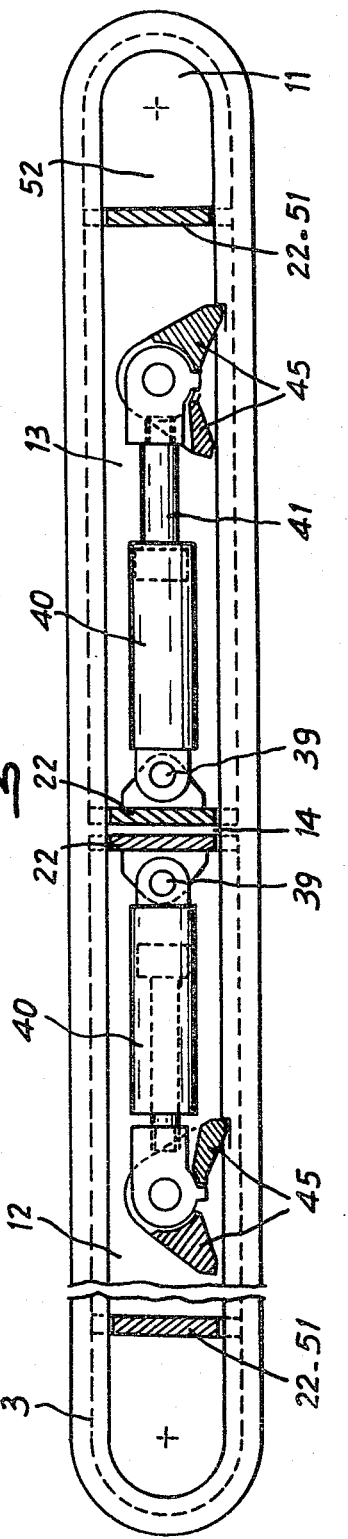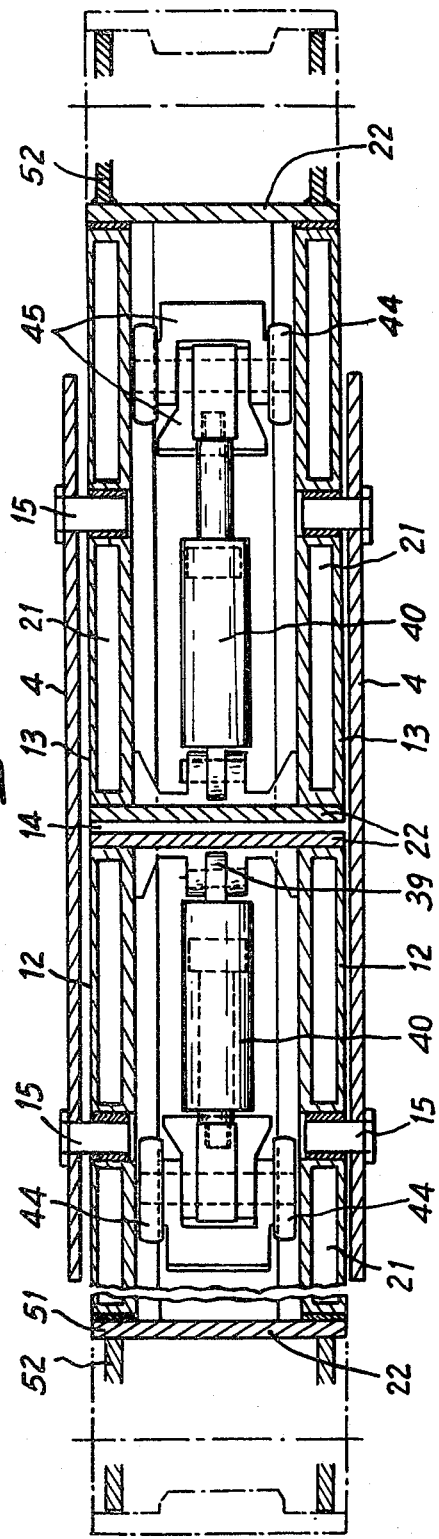

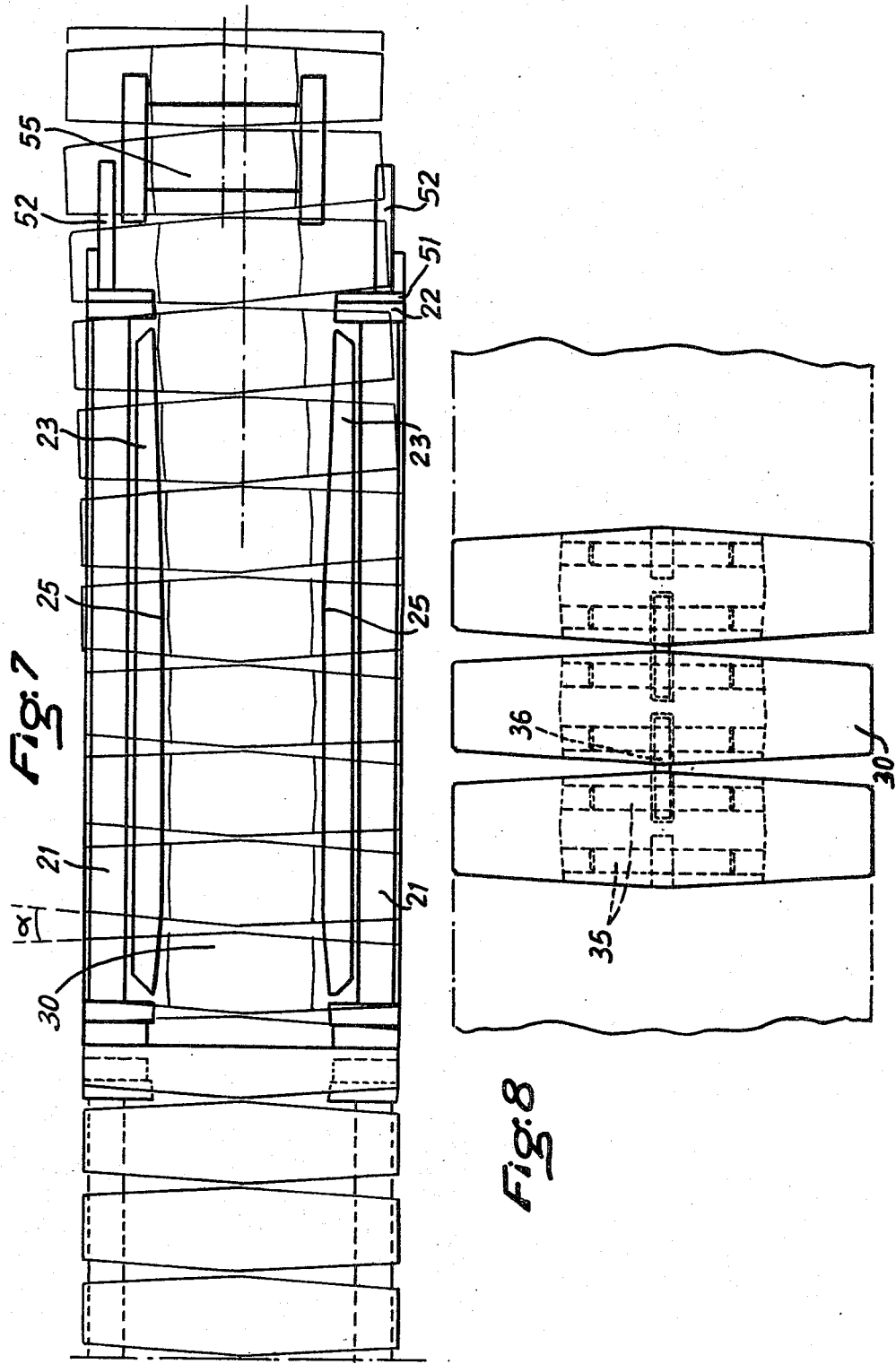

ADVANCING SUPPORT

BACKGROUND OF THE INVENTION

The present invention relates to an advancing support particularly intended for use as a prop in mine galleries.

DISCUSSION OF PRIOR ART

German patent application No. 1,139,084 describes an advancing support which includes at least two carriages for articulated tracks, each of which is composed of a beam having rounded ends and an articulated or caterpillar track closely surrounding the beam and mounted for sliding friction on the beam, the carriages being disposed one above the other to be respectively applied to the floor and the roof of a gallery and connected together by at least one jack attached to their respective beams. However, in such known supports the beam which rests on the floor is rigid and the beam which abuts against the roof has a single point of articulation with a horizontal axis, so that the carriages do not satisfactorily fit the irregularities of the surfaces of the roof or floor, particularly when the roof or floor has surfaces sloping oppositely at the front and rear of the carriage at the point where the track no longer lies flat against the roof or floor. Furthermore, when the support changes course stresses which are liable to damage the articulation of the articulated beam arise, particularly when the sloping surfaces mentioned above are present. All in all the whole arrangement lacks flexibility and is difficult to guide in a curved path.

SUMMARY OF THE INVENTION

The object of the invention is to provide an advancing support which will be sufficiently flexible to be able to move along a gallery having irregularities in the surfaces of its roof and floor, and which will also be able to advance by its own means, even following a curved path.

According to the present invention there is provided a continuous propping and comprising at least two carriages for articulated tracks, each of said carriages including a beam having rounded ends and an articulated track closely surrounding the beam mounted for sliding friction on the beam, each of said beams being divided into spaced-apart longitudinal elements, a connecting element pivotally attached to each of said longitudinal elements for joining them together, said carriages being disposed one above the other to be applied respectively against the floor and roof of a gallery; at least one jack attached to the connecting element of the upper carriage and the connecting element of the lower carriage thereby joining said carriages together.

Each connecting element is preferably a bogie.

It is advantageous for each of the spaced-apart longitudinal elements to be joined to their respective bogies by pivots having a horizontal transverse axis, and for the two bogies to be connected by at least two longitudinally spaced jacks.

In one embodiment of the present invention the connection between the bogies and the jacks is an articulated connection.

In a preferred arrangement, each articulated carriage comprises at least one linear driving mechanism for the for track, this mechanism advantageously being a jack acting directly on at least one shoe of the track by means of a pawl.

It is advantageous for the pawl to be reversible, so that the support can be moved forwards or backwards, as desired.

Preferably, at least one of the rounded ends of the beam which guide the tracks includes a directing means for laterally displacing the track to offset the track by engagement of surfaces.

It is advantageous for the directing means for laterally displacing the track to be a loose pulley engaging the track and adapted to be moved along its axis by chosen amounts to displace the track laterally. Desirably, the support of the invention includes guide rails for guiding the track, the guide rails having an inwardly curving edge in the vicinity of the ends of the beam, the curvature of the rails being such that the edge of the rails is in line with the respective edge of the directing means taken at its respective position of maximum lateral displacement.

According to another preferred feature of the invention the shoes of each track are coupled to one another by a coupling which permits the return of the track at the ends of the beam and relative lateral angular displacement of successive shoes, the shoes being shaped to allow this relative angular displacement to occur.

BRIEF DESCRIPTION OF THE DRAWINGS

The articulated support of the present invention will now be described, by way of example, with reference to the accompanying drawings, in which:

FIG. 3 is a vertical cross-section on the line III—III of FIG. 2;

FIG. 4 is a view on the line IV—IV of FIG. 2, shown partly in section,

FIG. 5 is a diagrammatic side view, partly in section, showing another carriage according to the invention;

FIG. 6 is a diagrammatic plan view, also partly in section, of the carriage of FIG. 5;

FIG. 7 shows the characteristics of the carriage which enable the course of the support of the invention to be changed when the support is moving forward or backwards; and FIG. 8 is a plan view of the coupling of the shoes of a track for a support according to the invention.

DESCRIPTION OF PREFERRED EMBODIMENTS

Figure 1:
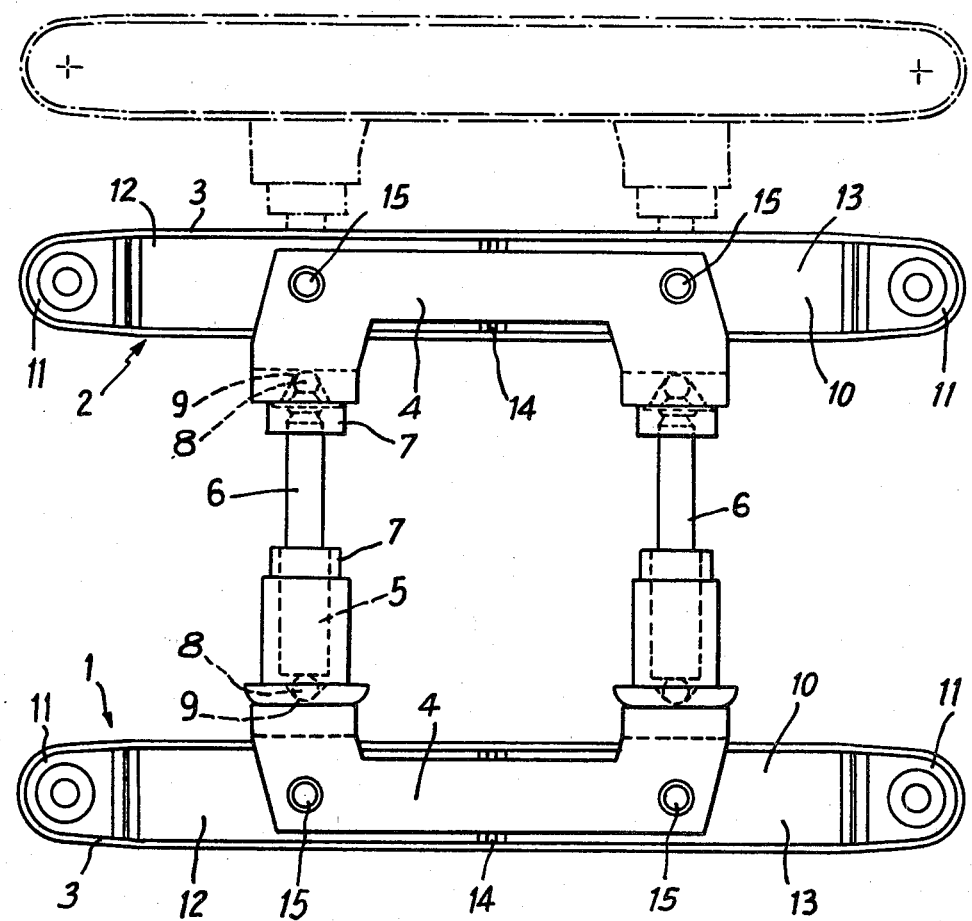
FIG. 1 is a diagrammatic side view of a support according to the invention, in two positions, the higher position being shown in broken lines.

As illustrated in FIGS. 1 to 4, a support according to the invention comprises two carriages 1 and 2, each provided with a shoe type articulated track 3. One carriage 2 is mounted above the other carriage 1, carriage 2 being inverted relative to carriage 1 and the carriage 1 being on the ground. Carriage 1 and carriage 2 respectively constitute the lower tread and the upper tread of a longitudinally symmetrical advancing support which can be tightened against the floor and roof of the chamber by means of two jacks or props 5 which are longitudinally spaced. The support of the invention also comprises a mechanism for driving the shoes of the track 3, which will be discussed in detail later on.

The carriages 1 and 2 are usually identical, but they could also be of different lengths and/or widths, as is known per se. Each of the carriages 1 and 2 has a beam indicated in the drawings by the general reference 10 and having rounded ends 11.

Each beam 10 is composed of two longitudinal elements 12, 13 between which a space or clearance 14 is left and which are joined by a bogie 4.

The bogie 4 therefore serves as an element connecting together the elements 12, 13 of each carriage 1 or 2. The connection of the bogies 4 and the longitudinal elements 12, 13 is made by horizontal pivot pins 15 disposed perpendicularly to the longitudinal direction of the support.

The props 5 are connected to the carriages 1 and 2 by means of the bogies 4. For this purpose the ends of the barrels 5 and of the punches or piston rods 6 of the jacks each end balls 8 captive in sockets 9 provided on each of the bogies 4. The ball joints thus formed each have an angle of articulation limited by an annular stop 7 provided with springs and of a type known per se.

Each longitudinal element 12, 13 is composed of two lateral boxes 21 joined at each end by connecting plates 22 and optionally by additional braces.

The beams 10, each of which is composed of two longitudinal elements 12, 13 whose ends 11 are rounded to form the ends of each beam 10, are each closely surrounded by its shoe type articulated track 3.

The articulated tracks are composed of shoes 30 having the same width as the elements 12 and 13. The shoes 30 are provided with bosses 31 which are directed towards the beam 10 and which have lateral guide faces 32 cooperating with lateral guide rails 23 embedded longitudinally in the outer edges of the mutually opposite faces of the two boxes 21. Each pair of guide rails 23 thus constitutes a guide in which the guide bosses 31 of the shoes 30 can move with sliding friction. Similarly, the bosses 31 serve to guide the shoes 30 and thus the track 3 onto the ends 11 which serve to return the track. In order to reduce the friction between the shoes and those parts of the beam 10 which they contact, the parts in contact may be treated by sulphonitration.

One of the longitudinal elements 13 of the beam has a hydraulic jack 40 fixed at 39 on one of the plates 22. The piston rod 41 of the said jack is provided at its end 42 with a pawl 43 having a transverse horizontal pin 44, the pawl being adapted to apply thrust to the boss 31 of each shoe 30 or to a depression 33 provided in the boss. It can be seen that extension of the jack 40 by movement of piston rod 41 tends to push the support from the right to the left in FIG. 2. The end 42 of the piston rod 41 of the jack 40 carries a double roller 44 guided by the guide rails 23.

When the jack 40 is retracted, the pawl escapes from the bosses and can re-engage in order to cause the support to advance again.

FIGS. 5 and 6 show in simplified form an alternative arrangement in which there are two jacks 40 each of whose ends is provided with a double pawl 45 the direction of engagement of which is controllably reversible, thus enabling the support to be driven forwards or backwards.

Returning now more particularly to FIG. 4, there is shown a form of construction of the end 11 which enables one to change the course of the advancing support of the invention as it moves forward or backward. A construction of this kind may be applied to only one or to both ends of each beam 10.

To the connecting plate 22 is welded a plate 51 carrying two rounded flanges 52 on which is mounted, fixed by both ends, a rod 53 of a central piston 54 constituting the fixed piston of a double-action jack. The piston 54 is surrounded by a loose pulley 55 in the form of a spool having flanges 56, the distance between which corresponds to the width of the bosses 31 of the shoes 30. The spool 55 has a central cylinder 58 cooperating with the piston 54 in order to form the double-action jack. A space 57 is provided between the flanges 56 of the spool 55 and the fixed flanges 52. A scraper plate 59 for cleaning the pulley 55 is adapted to slide in a transverse slide guide 60 in the plate 51.

It is seen that by the application of hydraulic pressure to one or the other of the two chambers of the central-piston jack 54, the spool 55 can be moved to the right or to the left, thus laterally shifting the track shoes 30 as they pass over the end of the beam 10, as illustrated in FIG. 7. This enables the advancing support of the present invention to change course as it moves forwards or backwards.

In FIG. 7 it can also be seen that at the ends of the beam 10, the guide rails 23 have an inwardly curving edge at least at 25 which is in line with the respective edge of the pulley 55, when this is at its respective end offset positions on the right and left, one of these positions being precisely that shown in FIG. 7.

Figure 2:
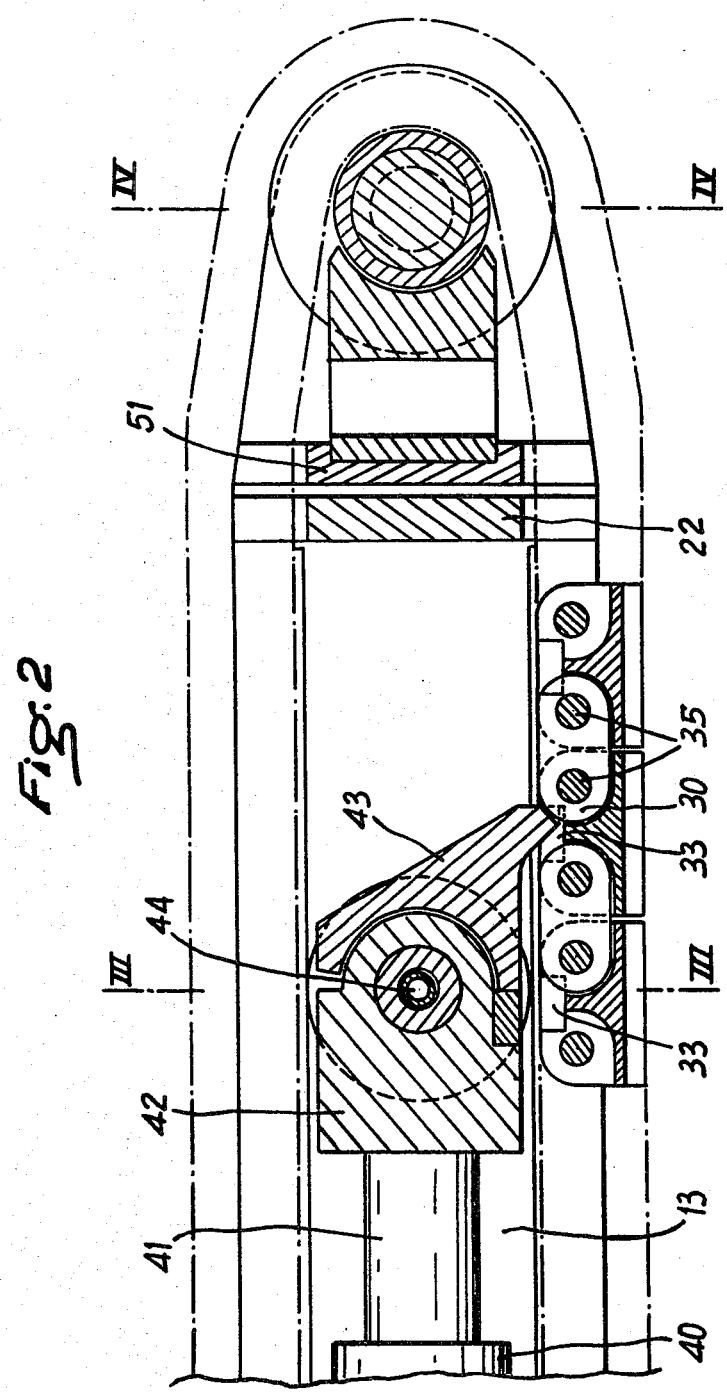
FIG. 2 shows, on a larger scale and partly in vertical section, a side view of one of the end parts of one of the two carriages of the support shown in FIG. 1.

In FIG. 7 and also in FIG. 8 it can also be seen that the shoes 30 of the track 3 have an angular movability. This is obtained by the convex shape of the mutually opposite faces of the shoes 30 and through the very flexible central coupling of these shoes. The flexibility of this coupling, which is illustrated in FIGS. 2, 3 and 8, is achieved by means of horizontal pins 35 mounted facing one another on the successive shoes 30 and joined together by rings 36 disposed in the plane of symmetry of the apparatus.

Because of the relative flexibility of its constituent beams and of the pivoted connections between props and bogies, the articulated support of the invention can move forwards or backwards while remaining pressed against the roof and floor of a passageway in spite or irregularities in these surfaces. It therefore makes it possible to provide uninterrupted propping of the roof of a chamber while controlling the course of the advance or backward movement of the support of the invention by means of the steering arrangement described above.

A number of advancing supports according to the invention may be used together, for example to achieve continuous propping in mine workings, while because of its ability to follow a curved path the support can be used in mine galleries.

Without departing from the scope of the invention it is envisaged that it would be possible to construct supports according to the invention having four or more props or jacks 5.

It would in addition be within the scope of the invention to provide beams composed of more than two spaced-apart longitudinal elements associated with bogies having a number of connecting pins corresponding to the number of elements.

What is claimed is:

1. An advancing support for providing a continuous propping and comprising at least two carriages for articulated tracks, each of said carriages including a beam having rounded ends and an articulated track closely surrounding the beam mounted for sliding friction on the beam, each of said carriages extending along a longitudinal axis, each beam having at least two longitudinal elements spaced-apart in end to end relation along said longitudinal axis, a connecting element pivotally attached to each of said longitudinal elements of a said beam for joining said longitudinal elements together, said carriages being disposed one above the other to be applied respectively against the floor and roof of a gallery; at least one jack attached to the connecting element of the upper carriage and the connecting element of the lower carriage thereby joining said carriages together.

2. A support as claimed in claim 1, in which each connecting element is a bogie.

3. A support as claimed in claim 2, in which the spaced-apart longitudinal elements are each connected to their respective bogie by pivoted joints having a horizontal transverse axis.

4. A support as claimed in claim 2, in which two bogies are connected by at least two longitudinally spaced jacks.

5. A support as claimed in claim 4, in which the bogies and the jacks are pivotally connected.

6. A support as claimed in claim 1, in which each carriage has at least one linear drive mechanism for the track, the mechanism comprising a jack acting directly on at least one shoe of the track by means of a pawl.

7. A support as claimed in claim 6, in which the pawl is reversible so that the support can be moved forwards or backwards, as desired.

8. A support as claimed in claim 1, in which at least one of the rounded ends of the beams which guide the tracks includes a directing means composed for laterally displacing the track to offset the track by engagement of surfaces.

9. A support as claimed in claim 8, in which the directing means includes a loose pulley engaging with the track, the pulley being axially movable by chosen amounts to displace the track laterally.

10. A support as claimed in claim 8, also including guide rails for guiding the track, the guide rails having an inwardly curving edge in the vicinity of the ends of the beam, the curvature of the rails being such that the edge of the rails is in line with the respective edge of the directing means taken at its respective position of maximum lateral displacement.

11. A support as claimed in claim 1, in which the shoes of each track are coupled to one another by a coupling which permits the return of the track at the ends of the beam and relative lateral angular displacement of successive shoes, the shoes being shaped to allow this relative angular displacement to occur.

12. An advancing support for providing a continuous propping and comprising at least two carriages for articulated tracks, each of said carriages including a beam having rounded ends and an articulated track closely surrounding the beam mounted for sliding friction on the beam, each of said beams being divided into spaced-apart elements, a bogie pivotally attached to each of said longitudinal elements by pivoted joints having a horizontal transverse axis for joining said longitudinal elements together, said carriages being disposed one above the other to be applied respectively against the floor and roof of a gallery; at least one jack attached to the connecting element of the upper carriage and the connecting element of the lower carriage thereby joining said carriages together.

* * * * *